(No Model.)
G. W. COFFEE.
STEAM TRAP.
No. 302,622. Patented July 29, 1884.
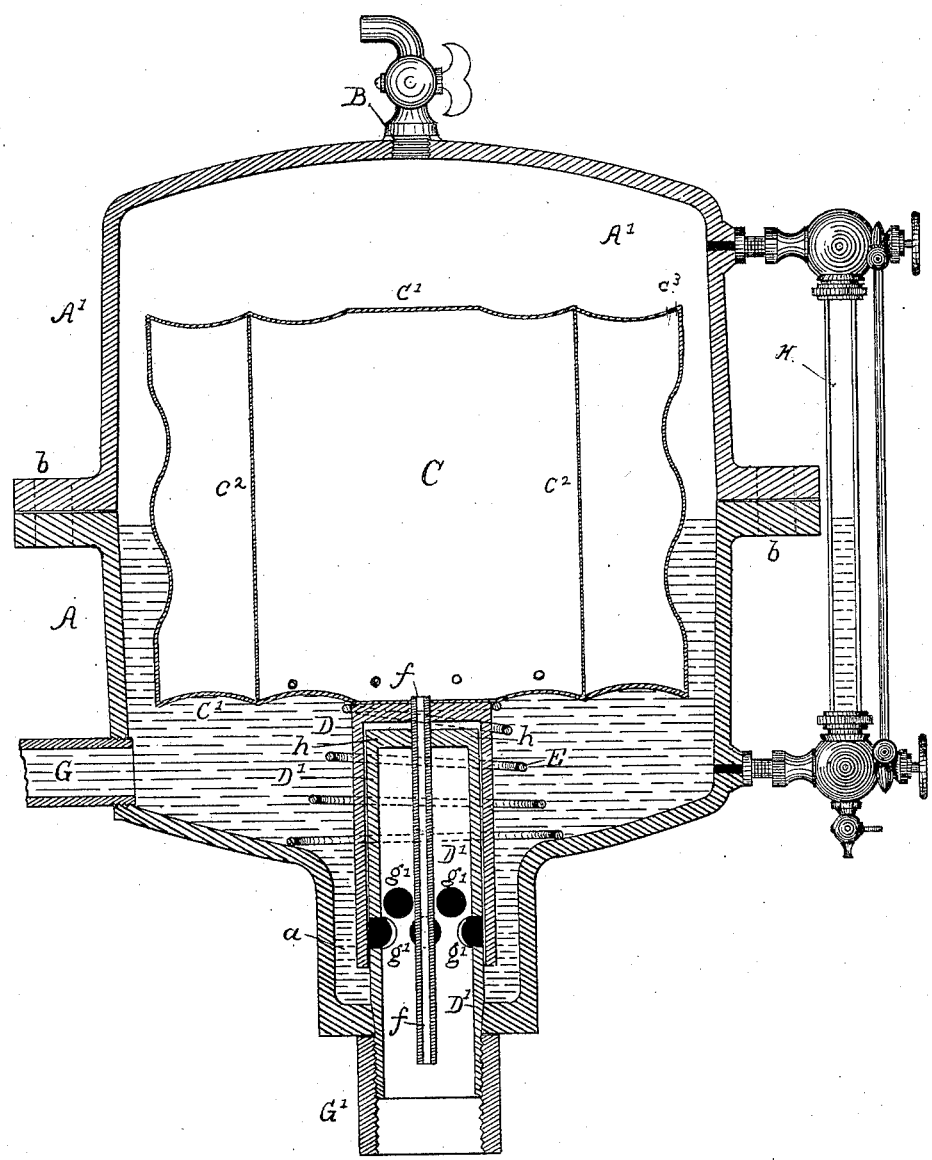

UNITED STATES PATENT OFFICE.

GEORGE WAYNE COFFEE, OF HAIKU, MAUI, HAWAIIAN ISLANDS.

STEAM-TRAP.

SPECIFICATION forming part of Letters Patent No. 302,622, dated July 29, 1884.

Application filed November 5, 1883. (No model.) Patented in Hawaiian Islands June 15, 1882.

*To all whom it may concern:*

Be it known that I, GEORGE W. COFFEE, a citizen of the United States, at present residing at Haiku, Maui, Hawaiian Islands, have made and invented certain new and useful Improvements in Steam-Traps; and I do hereby declare that the following is a full, clear, and exact description of my said invention and of the manner in which I proceed to apply, use, construct, and carry out the same, the accompanying drawing being referred to as a part of this specification.

My invention relates to improvements in that class of steam-traps in which a telescopic or sliding tube is operated by a float within a closed chamber, to cover and uncover openings through which water of condensation is discharged from the trap.

In the said drawing, herein referred to by letters, I show a vertical section through a steam-trap constructed after my invention.

A and A' represent the two halves or parts of the shell or body of the trap united together by exterior flanges, $b\ b$, and screws or bolts.

B is an outlet in the top, controlled by a cock.

C is the float, consisting of a cylindrical shell having the ends closed by heads C' C'. The cylindrical body of this float is of sheet metal, with corrugations running circumferentially around it. The heads C', also of corrugated metal, are sustained and the structure braced by an internal cylinder, $C^2$, fixed in the hollow space of the float, and united at top and bottom to the heads C'. An inlet-aperture, $c^3$, in the upper head admits steam to the interior of the float from the surrounding steam-space and counteracts the exterior pressure.

D is a tubular stem fixed to and extending perpendicularly from the bottom of the float C. It constitutes one part of a telescopic tube, of which the other and stationary part, D', is fixed in the bottom of the lower section, A, of the trap-chamber. The portion of the chamber where this tube works is enlarged longitudinally, so as to produce a well, $a$, and in the bottom of this extension a tapering hole and seat is made to receive the end of the fixed tube D'. This end being tapered to fit the seat, a screw-thread is made upon the extreme end, beyond the taper, to receive a coupling, G', outside. This extension of the shell A, to produce the well, is made somewhat larger transversely than the diameter of the contained telescopic tube. The top $h$ of the fixed tube D' is closed, and openings $g'\ g'$ in the sides, circumferentially and also in rows or alternately—one above the other—are provided for discharge of the water from the surrounding chamber through the tube. Over this fixed tube slides the movable tube D, the vertical movement of which, being produced by the rise and fall of the float, covers and uncovers the outlets. Immediately around this outer tube I place a spiral conical-shaped spring, E, the base resting upon the bottom of the chamber A, and the smaller end surrounding the hollow stem and bearing against the head of the float. Passing through the bottom of the float and downward through the center of the tube is a small drain-tube, $f$, the office of which is to relieve the interior of the float of any water collecting therein.

G is the connection for the steam-pipe and the inlet to the trap. The coupling G' connects the trap and discharge-pipe together, and also serves to secure the tube D'.

H is a gage placed upon the side of the trap-chamber, to show its action under work.

As thus constructed, my improved trap is both strong, simple, inexpensive, and extremely sensitive. Its operation is as follows: The trap being empty and the float being at its lowest point, all the apertures in the discharge-tube are covered. Steam entering the chamber through the inlet G, with the water of condensation draining from the pipes with which the trap is connected, will pass around the float and into the top of the trap, while the water collects below. When the level of this collecting water rises to the float and to a sufficient height to buoy it, the sliding tube is raised and the outlets in the discharge-tube are uncovered. The amount of water required to start the float is very small, as the spring E tends to overcome the weight of the float and the pressure upon the tube D.

Having thus fully described my invention, what I claim, and desire to secure by Letters Patent, is—

1. A steam-trap consisting of the main chamber A A, having the extension chamber or reservoir $a$, with its discharge-tube D', in combination with the closed hollow float C, with its drain-pipe $f$, and telescopic or sliding tube D, closed at top and sides, arranged to close and unclose the holes $g$ $g$ in the discharge-tube D' as the float C rises and falls.

2. In a steam-trap, the combination, with the closed hollow float having the drain-pipe $f$ and the telescoping tube D, closed at top and sides, of the discharge-pipe D', provided with discharge-openings adapted to be opened or closed by the rise or fall of the float, as set forth.

3. In a steam-trap, the hollow float C, having the corrugated side or body, and provided with an inner drum or cylinder, $C^2$, placed between the top and bottom of the float, so as to brace the two heads, substantially as set forth.

4. In a steam-trap, the float C, provided with a spring, E, placed directly between its bottom and the bottom of the trap-case, to assist in raising the float and producing sensitive action with a low level of water in the trap.

5. In combination with the trap shell or body having the well or extension $a$, a tapering seat for the discharge-tube D', and the tube D', with screw-threaded end, the screw-sleeve forming both a fastening for the discharge-tube and a connection for a discharge-pipe to the bottom of the chamber.

GEORGE WAYNE COFFEE. [L. S.]

Witnesses:
   CHR. BLOM HOFGUARD,
   C. H. DICKEY.